Nov. 28, 1939.   E. KOSA, SR   2,181,405
METHOD OF MAKING ANIMATED MOTION PICTURES
Filed March 30, 1938   2 Sheets-Sheet 1

INVENTOR.
EMIL Kosa, Sr.,
BY
ATTORNEY.

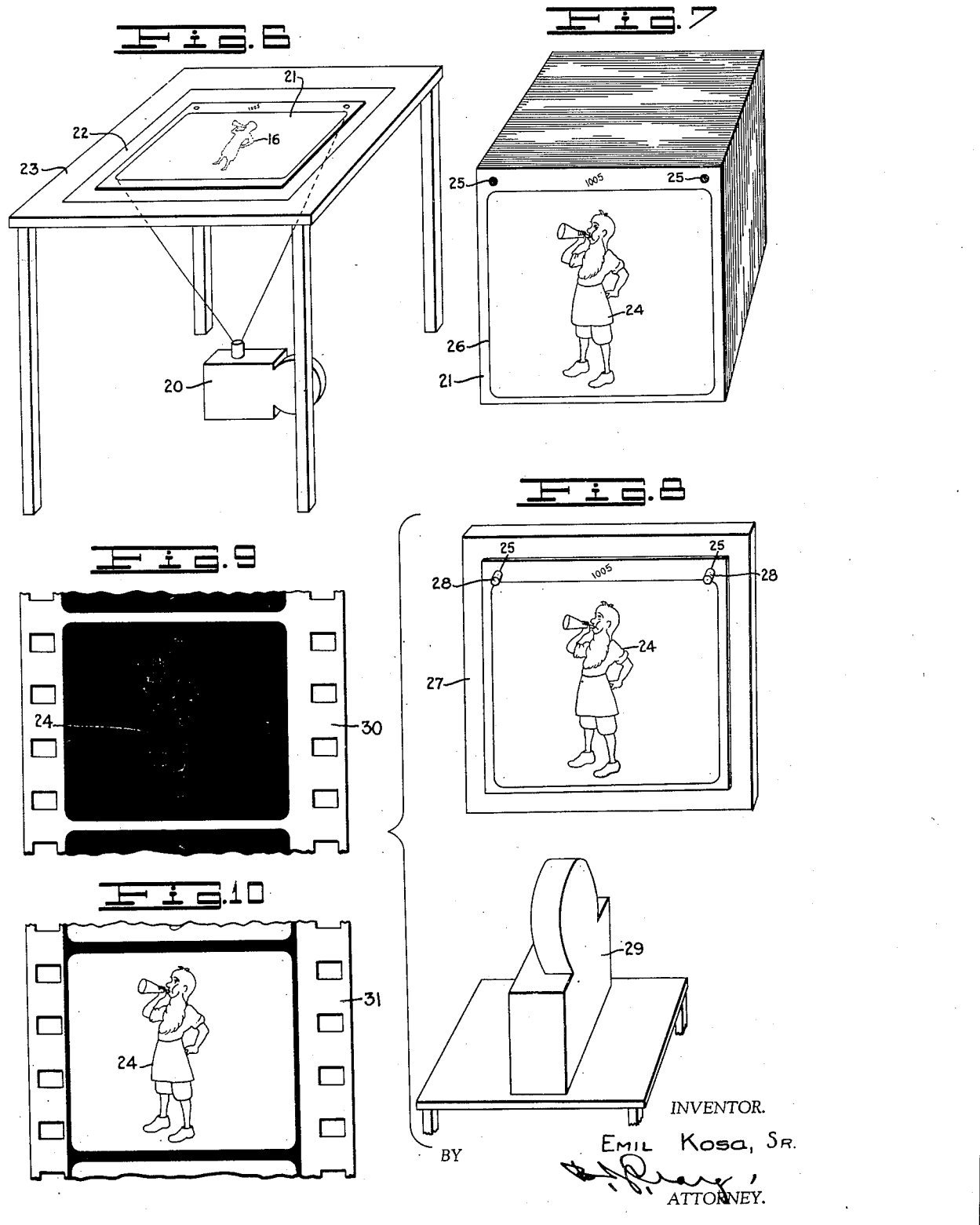

Patented Nov. 28, 1939

2,181,405

UNITED STATES PATENT OFFICE 2,181,405

METHOD OF MAKING ANIMATED MOTION PICTURES

Emil Kosa, Sr., Los Angeles, Calif.

Application March 30, 1938, Serial No. 198,846

3 Claims. (Cl. 88—16)

This invention relates to improvements in methods of making animated motion pictures.

The general object of the invention is to provide an improved method of making an animated motion picture wherein the animated characters have life like actions.

A further object of the invention is to provide a method of producing animated motion pictures wherein the animated characters are drawn on cells over the projected outline image of a photographed live character.

Other objects and the advantages of this invention will be apparent from the following description taken in connection with the accompanying drawings, wherein:

Fig. 6 is a view showing one means of projecting the outline film on a transparent cell;

Fig. 7 is a perspective view of a plurality of cells having the animated character thereon;

Fig. 8 is a view showing one method of photographing each of the cells shown in Fig. 7 upon a single frame of a motion picture film;

Fig. 9 is a fragmentary portion of a negative motion picture film made as shown in Fig. 8; and Fig. 10 is a fragmentary portion of a positive motion picture film printed from the film shown in Fig. 9.

Figure 1:
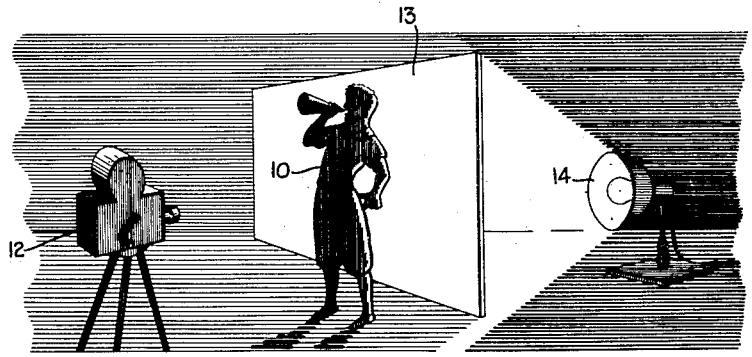
Fig. 1 is a perspective view showing the method of photographing a living character.

As previously stated my invention is directed to an improved method of producing animated motion pictures wherein the animated character is drawn on a cell on which is projected an outline of a character.

To produce an animated motion picture with my method a motion picture is first taken of a character such as an actor 10. A motion picture camera 12 is employed to photograph the actor 10 acting in front of a translucent screen 13 which is shown as illuminated from the rear by a source of light 14. This produces a negative motion picture film 15 (see Fig. 3) having thereon a photographic image 16 of the actor 10.

Figure 2:
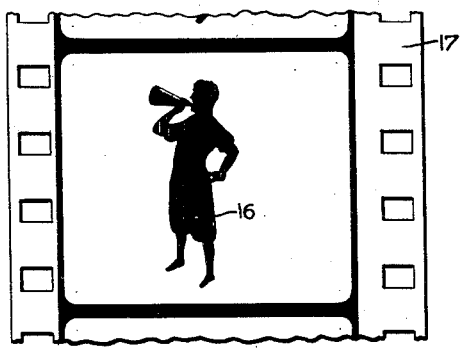
Fig. 2 is an enlarged portion of a motion picture positive film showing the character.

A positive motion picture film 17 (see Fig. 2) is then printed from the negative 15. In the positive the image 16 appears as a semi-silhouette, that is the image is usually quite dark with the details thereof showing but faintly.

Figure 3:
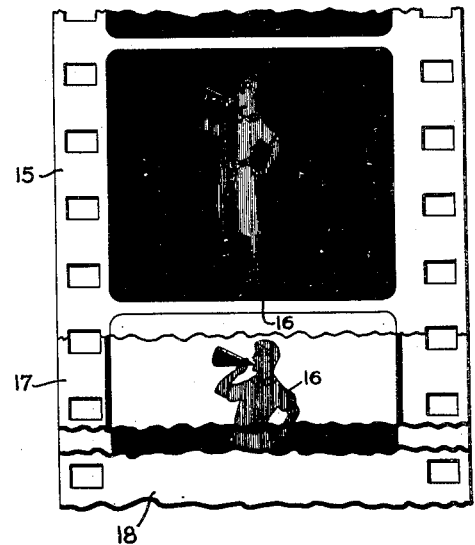
Fig. 3 is an enlarged fragmentary portion of the negative film superimposed on the positive film shown in Fig. 2 and with the two films superimposed on an unexposed film ready to be exposed.
Figure 4:
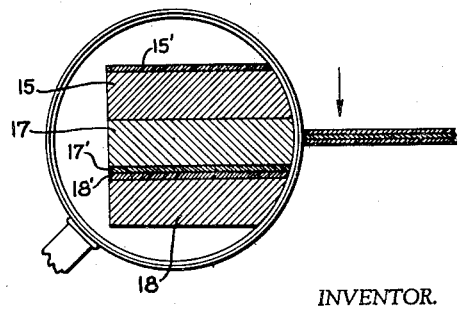
Fig. 4 is a fragmentary section taken through the superimposed films with a portion thereof shown as magnified.

Thereafter as shown in Figs. 3 and 4 the positive film 17 is superimposed on an unexposed film 18 and the negative film 15 is superimposed on the positive film 17. The three films 15, 17 and 18 are so arranged that the film 18 is positioned with its emulsion 18' engaging the emulsion 17' on the positive film 17 and with the emulsion 15' on the negative film 15 remote from the emulsion 17' as shown, for example, by the magnified portion of Fig. 4.

Figure 5:
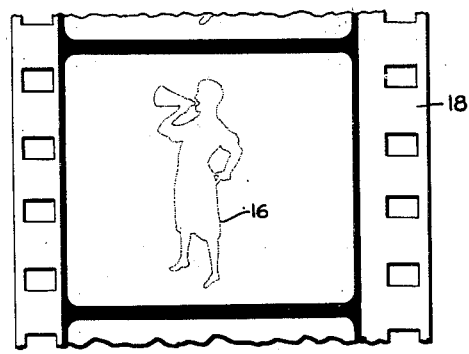
Fig. 5 is a fragmentary portion of the unexposed film of Fig. 3 after this film has been exposed and finished.

The film 18 is then exposed to light passing through the films 15 and 17 in the direction indicated by the arrow in Fig. 4. The film 18 when finished has thereon a faint outline of the character 16 as shown in Fig. 5.

Thereafter as shown in Fig. 6 the print film 18 is positioned in a motion picture projection machine 20 which projects one frame at a time of the film 18 upon a transparent cell member 21, as for example, through a transparent support 22 in a table member 23. An artist then draws an animated character 24 upon the cell 21 (see Fig. 7) using the projected outline of the character 16 as a basis for the animated portions of the character 24. Each frame of the print film is thus projected on a cell 21 and the artist draws the animated character thereon thereby producing a series of the cells 21 one for each frame of the film 18.

Each of the cells 21 may be provided with gauge holes 25 which are in exactly the same relationship to the frame space 26 upon each cell and the cells are consecutively numbered. Of course, it will be understood that in lieu of the gauge holes 25 other expedients may be employed to correctly center the cells.

Thereafter as shown in Fig. 8 the cells 21 are placed one at a time upon a suitable support 27 having gauge pins 28 projecting therefrom which are positioned in the gauge holes 25 of the cells. The cells 21 are then successively photographed by a motion picture camera 29, one cell at a time, each upon a separate frame of a negative film 30 as shown in Fig. 9.

From the negative film 30 a positive film 31 is printed (see Fig. 10) which when projected will produce an animated motion picture wherein actions of the animated character 24 thereon will be true to life.

From the foregoing it will be apparent that I have provided a novel method of producing animated motion pictures which is simple, inexpensive and highly efficient in result.

Having thus described my invention I claim:

1. The method of making an animated motion picture film comprising photographing a subject in front of a translucent screen to produce a negative film in silhouette, making a positive film from the negative, superimposing the positive and the negative in exact registration with the emulsions out of engagement, exposing a film to light passing through the first mentioned negative and positive and developing it to produce a film having an outline of the subject, projecting the last mentioned film frame by frame onto a transparent cell and producing a series of cells using one cell for each frame and using the outline projected onto the cell as a guide in drawing upon the cell, then photographing the cells frame by frame to secure a negative and making a positive from the negative.

2. The method of making an animated motion picture film comprising photographing a subject in front of a translucent screen which is lighted from the rear to produce a negative film in silhouette of the subject, making a positive film from the negative, superimposing the positive upon the negative in exact registration and with the emulsions out of engagement, placing a negative unexposed film with the emulsion thereon upon the superimposed first mentioned negative and positive, exposing the unexposed film to light passing through the superimposed negative and positive, and developing it to produce a film having an outline of the subject, then projecting the last mentioned film onto a transparent cell and using the outline as a guide in drawing upon the transparent cell, then photographing the cells frame by frame to secure a negative and making a positive from the negative.

3. The method of making an animated motion picture film comprising making a series of photographs of a moving subject and thereby producing a negative film of the subject, making a positive film from the negative film, arranging the positive and negative films in exact registration and with the emulsions on the negative film and positive film out of engagement, projecting light through the superimposed negative and positive films to produce successive projected images of an outline of the subject visible upon a series of cells, employing the successively projected images of the outline of the subject as guides in drawing a character upon the series of cells and thereafter successively photographing the drawings of the character on a film.

EMIL KOSA, Sr.